(12) United States Patent
Sim (10) Patent No.: US 12,441,288 B2
(45) Date of Patent: Oct. 14, 2025

(54) ELECTRO-MECHANICAL BRAKE SYSTEM AND CONTROL METHOD THEREOF

(71) Applicant: HL MANDO CORPORATION, Pyeongtaek (KR)

(72) Inventor: Gyunghun Sim, Seongnam (KR)

(73) Assignee: HL MANDO CORPORATION, Pyeongtaek (KR)

( * ) Notice: Subject to any disclaimer, the term of this patent is extended or adjusted under 35 U.S.C. 154(b) by 112 days.

(21) Appl. No.: 18/466,858

(22) Filed: Sep. 14, 2023

(65) Prior Publication Data
US 2024/0246525 A1    Jul. 25, 2024

(30) Foreign Application Priority Data

Jan. 19, 2023   (KR) .................. 10-2023-0008191

(51) Int. Cl.
*B60T 17/22*      (2006.01)
*B60T 13/74*      (2006.01)

(52) U.S. Cl.
CPC .......... *B60T 17/221* (2013.01); *B60T 13/741* (2013.01); *B60T 2270/406* (2013.01)

(58) Field of Classification Search
CPC ............................. B60T 17/221; B60T 13/741
See application file for complete search history.

(56) References Cited

U.S. PATENT DOCUMENTS

| | | | |
|---|---|---|---|
| 10,422,396 B2 | 9/2019 | Yao | |
| 2009/0183958 A1* | 7/2009 | Sano | B60T 8/4809 188/204 R |
| 2015/0041261 A1* | 2/2015 | Masuda | B60T 13/741 188/163 |
| 2016/0001752 A1* | 1/2016 | Yasui | B60T 8/172 701/70 |
| 2017/0355356 A1* | 12/2017 | Okada | B60T 7/06 |
| 2018/0162333 A1* | 6/2018 | Nakaoka | F16D 65/18 |
| 2022/0373051 A1* | 11/2022 | Jin | F16D 66/023 |
| 2022/0403902 A1* | 12/2022 | Kim | F16D 65/18 |
| 2023/0105090 A1* | 4/2023 | Nomura | F16D 65/183 188/72.3 |
| 2023/0392659 A1* | 12/2023 | Putz | F16D 65/38 |

FOREIGN PATENT DOCUMENTS

| | | |
|---|---|---|
| JP | 6414118 B2 | 10/2018 |
| KR | 101930694 B1 | 12/2018 |

\* cited by examiner

*Primary Examiner* — Long T Tran
(74) *Attorney, Agent, or Firm* — Harvest IP Law, LLP (57) ABSTRACT

An electromechanical brake system including an actuator of an electromechanical brake that operates by a motor, according to an aspect of the disclosure, includes: a motor driver configured to drive the motor; and a controller electrically connected to the motor driver, wherein the controller is configured to calculate a differential value of a control parameter for controlling the motor with respect to time while moving a brake pad of the electromechanical brake forward, compare the calculated differential value to a preset reference value to detect occurrence of a contact between the brake pad and a brake disc of the electromechanical brake, store a contact position at which the contact between the brake pad and the brake disc has occurred, and set an origin position by storing a position moved backward by a preset gap distance from the contact position.

14 Claims, 8 Drawing Sheets

ELECTRO-MECHANICAL BRAKE SYSTEM AND CONTROL METHOD THEREOF

CROSS-REFERENCE TO RELATED APPLICATION(S)

This application is based on and claims priority under 35 U.S.C. § 119 to Korean Patent Application No. 10-2023-0008191, filed on Jan. 19, 2023, in the Korean Intellectual Property Office, the disclosure of which is incorporated by reference herein in its entirety.

BACKGROUND

1. Field

The disclosure relates to an electromechanical brake and a control method thereof, and more particularly, to an electromechanical brake for correcting an origin position by detecting a sharp change of a control parameter to detect a contact between a brake pad and a brake disc, and a control method thereof.

2. Description of the Related Art

Brake systems for brake are essential to vehicles, and various types of brake systems are proposed for the safety of drivers and passengers.

Existing brake systems have generally used a method of supplying, when a driver steps on the brake pedal, hydraulic pressure for brake to the wheel cylinder through a booster mechanically connected to the brake pedal. However, lately, an electromechanical brake system that receives a driver's intention to brake as an electrical signal and operates a transmission device such as a motor based on the electrical signal to provide the vehicle's braking force is being developed as a next-generation brake system.

The electromechanical brake system provides a clamping force of the brake disc by converting a rotational force of a motor into linear motion through the motor, a reducer, etc., thereby performing a service brake and a parking brake of the vehicle.

In existing electromechanical brake systems, a drag phenomenon in which the brake pad is rubbed with the brake disc has occurred during a brake release operation in which a driver does not step on the brake pedal.

The electromechanical brake systems can perform position control because a piston pressing the brake pad is connected to a motor. Accordingly, the brake pad is controllable to separate from the brake disc when braking is released, thereby preventing the occurrence of the drag phenomenon.

However, in order to control the position of the brake pad, it is necessary to accurately identify the position of the piston or brake pad. For this, a sensor for identifying the position of the piston or brake pad is needed. However, since the price of the sensor is high compared to a simple function of correcting the position of the brake pad, technology for identifying the position of the brake pad without using such a sensor needs to be developed.

SUMMARY

It is an aspect of the disclosure to provide an electromechanical brake for correcting an origin position by detecting a sharp change of a control parameter to detect a contact between a brake pad and a brake disc, and a method for controlling the electromechanical brake.

Additional aspects of the disclosure will be set forth in part in the description which follows and, in part, will be obvious from the description, or may be learned by practice of the disclosure.

In accordance with an aspect of the disclosure, an electromechanical brake system including an actuator of an electromechanical brake that operates by a motor, includes: a motor driver configured to drive the motor; and a controller electrically connected to the motor driver, wherein the controller is configured to calculate a differential value of a control parameter for controlling the motor with respect to time while moving a brake pad of the electromechanical brake forward, compare the calculated differential value to a preset reference value to detect occurrence of a contact between the brake pad and a brake disc of the electromechanical brake, store a contact position at which the contact between the brake pad and the brake disc has occurred, and set an origin position by storing a position moved backward by a preset gap distance from the contact position.

The control parameter may be motor current, and the controller may be configured to calculate a differential value of the motor current with respect to time while moving the brake pad forward at constant target speed, and detect the occurrence of the contact between the brake pad and the brake disc, according to determination that the calculated differential value is greater than the preset reference value.

The control parameter may be motor revolutions per minute (rpm), and the controller may be configured to calculate a differential value of the motor rpm with respect to time while moving the brake pad forward based on a target clamping force, and detect the occurrence of the contact between the brake pad and the brake disc, according to determination that the calculated differential value is smaller than the preset reference value.

The controller may be configured to check whether ignition is turned on, move the brake pad forward when it is checked that the ignition is turned on, and set the origin position while the brake pad moves forward.

The controller may be configured to move, when it is checked that the ignition is turned on, the brake pad forward until a preset reference clamping force is obtained.

The controller may be configured to move the brake pad backward by a preset distance from an initial position of the brake pad of when the ignition is turned on, and move the brake pad forward until the reference clamping force is obtained, when the controller fails to set the origin position while the brake pad moves forward until the reference clamping force is obtained.

The controller may be configured to check whether a contact is determinable in a braking environment while braking is performed and the brake pad moves forward, calculate a differential value of a control parameter for controlling the motor with respect to time when it is checked that a contact is determinable, compare the calculated differential value to a preset reference value to detect the occurrence of the contact between the brake pad and the brake disc, update, when a difference between a position at which the contact between the brake pad and the brake disc has occurred and a stored contact position is greater than or equal to a preset update reference, the contact position to the position at which the contact has occurred, and update the origin position to a position moved backward by a preset gap distance from the contact position.

The controller may be configured to determine, when it is checked whether a contact is determinable in the braking environment, that a contact is not determinable according to determination that a clamping force of the brake pad is greater than or equal to a preset determinable clamping force.

The control parameter may be motor current, and the controller may be configured to determine, when it is checked whether a contact is determinable in the braking environment, that a contact is determinable according to determination that the brake pad moves forward at constant target speed.

The control parameter may be motor revolutions per minute (rpm), and the controller may be configured to determine, when it is checked whether a contact is determinable in the braking environment, that a contact is determinable when the controller moves the brake pad forward based on a target clamping force.

In accordance with an aspect of the disclosure, a method for controlling an electromechanical brake system including an actuator of an electromechanical brake that operates by a motor, includes: calculating a differential value of a control parameter for controlling the motor with respect to time while moving a brake pad of the electromechanical brake forward; comparing the calculated differential value to a preset reference value to detect occurrence of a contact between the brake pad and a brake disc of the electromechanical brake; storing a contact position at which the contact between the brake pad and the brake disc has occurred; and setting an origin position by storing a position moved backward by a preset gap distance from the contact position.

The control parameter may be motor current, the calculating of the differential value of the control parameter with respect to time may include calculating a differential value of the motor current with respect to time while moving the brake pad forward at constant target speed, and the detecting of the occurrence of the contact may include detecting the occurrence of the contact between the brake pad and the brake disc when the calculated differential value is greater than the preset reference value.

The control parameter may be motor revolutions per minute (rpm), the calculating of the differential value of the control parameter with respect to time may include calculating a differential value of the motor rpm with respect to time while moving the brake pad forward based on a target clamping force, and the detecting of the occurrence of the contact may include detecting the occurrence of the contact between the brake pad and the brake disc when the calculated differential value is smaller than the preset reference value.

The method for controlling the electromechanical brake system may include: checking whether ignition is turned on; moving the brake pad forward when it is checked that the ignition is turned on; and setting an origin position while the brake pad moves forward.

The moving of the brake pad forward may include moving the brake pad forward, when it is checked that the ignition is turned on, until a preset reference clamping force is obtained.

The method for controlling the electromechanical brake system may include, when setting an origin position fails while the brake pad moves forward until the reference clamping force is obtained, moving the brake pad backward by a preset distance from an initial position of the brake pad of when the ignition is turned on, and moving the brake pad forward until the reference clamping force is obtained.

The method for controlling the electromechanical brake system may include: checking whether a contact is determinable in a braking environment while braking is performed and the brake pad moves forward; calculating a differential value of a control parameter for controlling the motor with respect to time when it is checked that a contact is determinable; comparing the calculated differential value to a preset reference value to detect occurrence of a contact between the brake pad and the brake disc; updating, when a difference between a position at which the contact between the brake pad and the brake disc has occurred and a stored contact position is greater than or equal to a preset update reference, the contact position to the position at which the contact has occurred; and updating the origin position to a position moved backward by a preset gap distance from the contact position.

The checking of whether the contact is determinable in the braking environment may include determining that a contact is not determinable according to determination that a clamping force of the brake pad is greater than or equal to a preset determinable clamping force.

The control parameter may be motor current, and the checking of whether the contact is determinable in the braking environment may include determining that a contact is determinable according to determination that the brake pad moves forward at constant target speed.

The control parameter may be motor revolutions per minute (rpm), and the checking of whether the contact is determinable in the braking environment may include determining that a contact is determinable when the brake pad moves forward based on a target clamping force.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 7 shows a method for controlling an electromechanical brake system according to an embodiment when ignition is turned on.

DETAILED DESCRIPTION

Like reference numerals refer to like components throughout the specification. This specification does not describe all the components of the embodiments, and duplicative contents between general contents or embodiments in the technical field of the present disclosure will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being "connected" to another part, it includes not only a direct connection but also an indirect connection, and the indirect connection includes connecting through a wireless network.

Also, when it is described that a part "includes" a component, it means that the part may further include other components, not excluding the other components unless specifically stated otherwise.

The terms first, second, etc. are used to distinguish one component from another component, and the components are not limited by the above-mentioned terms.

The singular forms "a," "an," and "the" include plural referents unless the context clearly dictates otherwise.

In operations, identification numerals are used for convenience of explanation, the identification numerals do not describe the order of the operations, and the operations may be performed differently from the order specified unless the context clearly states a particular order.

Hereinafter, an operation principle and embodiments of the disclosure will be described with reference to the accompanying drawings.

Figure 1:
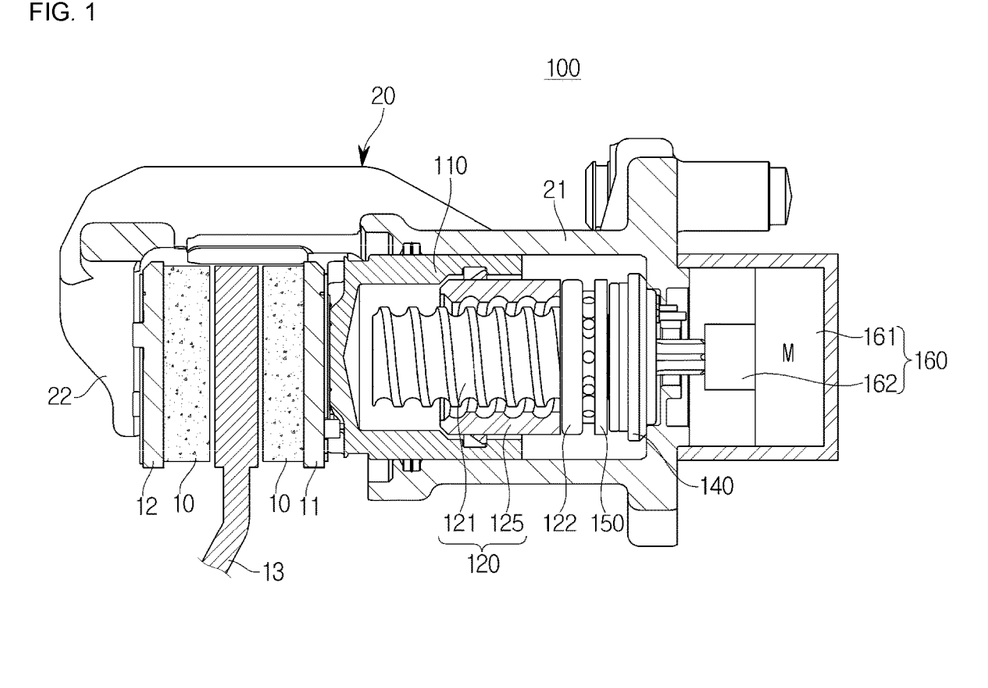
FIG. 1 shows a configuration of an electromechanical brake included in an electromechanical brake system according to an embodiment.

FIG. 1 shows a configuration of an electromechanical brake included in an electromechanical brake system according to an embodiment.

Referring to FIG. 1, an electromechanical brake 100 may include a carrier (not shown) in which a pair of pad plates 11 and 12 are installed to press a brake disc 13 rotating together with a wheel of a vehicle, a caliper housing 20 installed on the carrier to be slidingly movable on the carrier and configured to operate the pair of pad plates 11 and 12, a piston 110 installed inside the caliper housing 20 in such a way as to move back and forth, an actuator 160 configured to generate and provide a driving force for moving the piston 110, a power transmission unit 120 configured to realize an axial forward and backward movement of the piston 110 by receiving a rotational driving force provided from the actuator 160, converting the rotational driving force into linear motion and transferring the linear motion to the piston 110, a sensor 140 for measuring an adhesion force between the brake disc 13 and a brake pad 10 or a clamping force of the brake pad 10, and a controller 220 for controlling an operation of the actuator 160 based on information provided from the sensor 140.

The brake pad 10 may be attached to an inner surface of each of the pair of pad plates 11 and 12. The pair of pad plates 11 and 12 may include an inner pad plate 11 being in contact with the piston 110 and an outer pad plate 12 being in contact with a finger portion (which will be described below) 22 of the caliper housing 20, and the pair of pad plates 11 and 12 may be installed in the carrier in such a way as to be slidably movable. That is, the pair of pad plates 11 and 12 may be installed in the carrier fixed to a vehicle body and perform braking by moving back and forth toward both side surfaces of the brake disc 13.

The caliper housing 20 may include the finger portion 22 bent downward at the front portion (a left portion in FIG. 1) to operate the outer pad plate 12, and a cylinder portion 21 in which the piston 110 is installed, and the caliper housing 20 may be coupled to the carrier to be slidingly movable with respect to the carrier. The cylinder portion 21 and the finger portion 22 may be integrated into one body. As the caliper housing 20 slides from the carrier and moves toward the brake disc 13 by a reaction force caused by a movement of the piston 110 during braking of the vehicle, the outer pad plate 12 may approach the brake disc 13 by the finger portion 22 to press the brake disc 13.

The power transmission unit 120 may include a spindle 121 that rotates by receiving a driving force from the actuator 160, a nut 125 positioned inside the piston 110 and screw-coupled to the spindle 121 to move forward together with the piston 110 by a rotation in first direction of the spindle 121 or move backward together with the piston 110 by a rotation in second direction of the spindle 121, and a plurality of balls (not shown) interposed between the spindle 121 and the nut 125. The power transmission unit 120 may be provided as a ball-screw type transmission device that converts rotation motion of the spindle 121 into linear motion. The rotation in first direction of the spindle 121 may be a rotation in a direction of moving the nut 125 forward by a rotation of the spindle 121, and the rotation in second direction of the spindle 121, which is a rotation in an opposite direction of the first direction, may be a rotation in a direction of moving the nut 125 backward by a rotation of the spindle 121.

The spindle 121 may include a flange 122 rotatably positioned inside the cylinder portion 21 and extending in a radial direction. The flange 122 may be provided as a separate component and fixed to the spindle 121 to rotate integrally with the spindle 121. One side (left side) of the spindle 121 with respect to the flange 122 may be coupled to the nut 125, and another side (right side) may be connected to the actuator 160 to receive a driving force. Accordingly, the one side of the spindle 121 may be inserted inside the nut 125, and an outer thread 123 may be formed in an outer circumferential surface of the spindle 121 for coupling with the nut 125. Also, in the other side of the spindle 121, a bearing 150, and the sensor 140 for measuring a clamping force between the brake disc 13 and the brake pad 10 by detecting a load applied to the spindle 121 may be positioned.

The sensor 140 may be provided to measure an adhesion force or a clamping force between the brake disc 13 and the brake pad 10. The sensor 140 may be a force sensor that measures a clamping force between the brake disc 13 and the brake pad 10 by detecting a load of the spindle 121 or the actuator 160, although not limited thereto. The sensor 140 may transmit information about a measured clamping force of the brake pad 10 to the controller 220, and the controller 220 may determine wear, drag, etc. of the brake pad 10 based on the information about the clamping force measured by the sensor 140.

The actuator 160 may include a motor 161, and a reduction device 162 having a plurality of reduction gears, and the actuator 160 may generate a driving force by receiving power from a power supply installed in the vehicle. The actuator 160 may be connected to the other end of the spindle 121 and transfer the generated driving force as rotational motion of the spindle 121. The actuator 160 may be installed outside the caliper housing 20, and the reduction device 162 may use various structures, such as a planetary gear assembly or a worm structure, to reduce power of the motor 161 and transfer the power to the spindle 121. The motor 161 may press the piston 110 or release the piston 110 by rotating the spindle 121 to move the nut 125 back and forth. The reduction device 162 may be provided between an output side of the motor 161 and the spindle 121.

Figure 2:
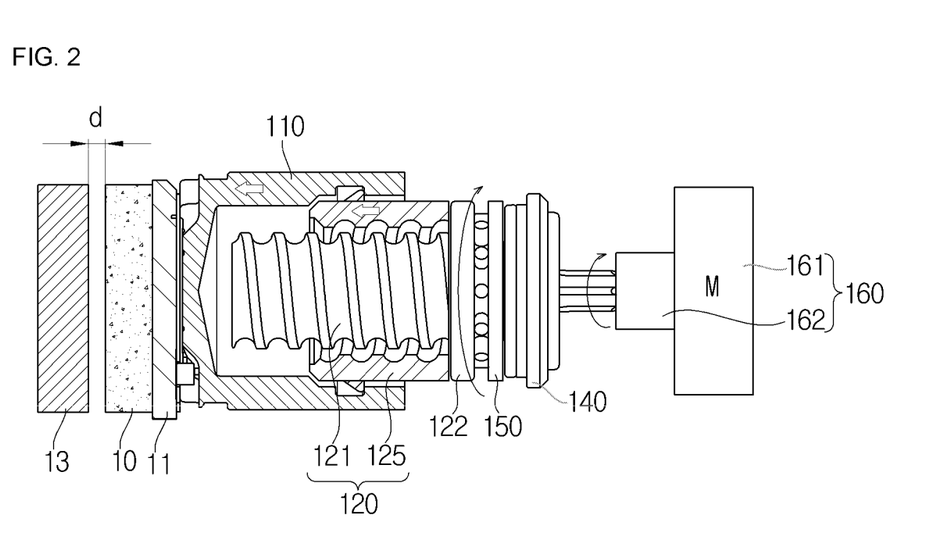
FIG. 2 shows a braking operation of an electromechanical brake included in an electromechanical brake system according to an embodiment.

FIG. 2 shows a braking operation of an electromechanical brake included in an electromechanical brake system according to an embodiment.

Referring to FIG. 2, the electromechanical brake 100 may perform a braking operation of pressing the piston 110 by rotating the spindle 121 in a direction (a solid arrow direction) by using the actuator 160 to move the nut 125, and pressing the inner pad plate 11 with the piston 110 pressed by the movement of the nut 125 to cause the brake pad 10 to be pressed to the brake disc 13 and thereby generate a clamping force.

While no braking occurs, the brake pad 10 may need to be controllable to be spaced a preset gap distance d from the brake disc 13 to prevent occurrence of a drag phenomenon.

However, because the brake pad 10 wears as braking is performed, the distance between the brake pad 10 and the brake disc 13 may change.

In addition, when the brake disc 13 expands due to heat as braking is performed during driving, the distance between the brake pad 10 and the brake disc 13 may change.

Accordingly, in order to keep the brake pad 10 spaced apart from the brake disc 13 by the preset gap distance d, it may be needed to continuously determine a contact position at which the brake pad 10 contacts the brake disc 13 and control the brake pad 10 to be located at a position spaced by the preset gap distance d from the contact position.

Figure 3:
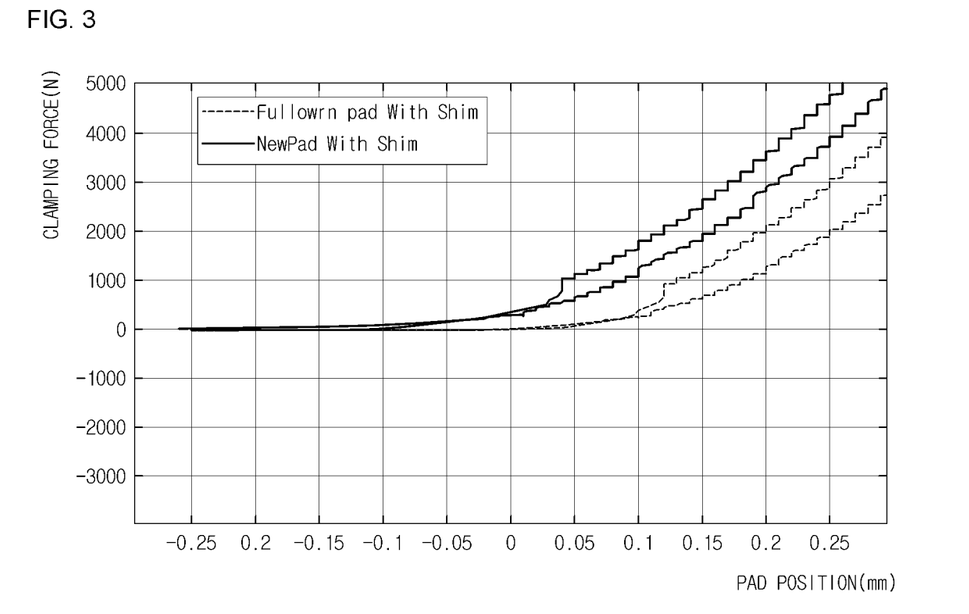
FIG. 3 shows clamping forces according to positions of a brake pad during an operation of an electromechanical brake system according to an embodiment.

FIG. 3 shows clamping forces according to positions of a brake pad during an operation of an electromechanical brake system according to an embodiment.

Referring to FIG. 3, a clamping force applied as the brake pad 10 moves back and forth in an electromechanical brake system 200 is shown.

As shown in FIG. 3, while the brake pad 10 moves back and forth, particularly, while the brake pad 10 moves forward, a clamping force may change sharply at a moment at which the brake pad 10 contacts the brake disc 13. In a case of a new brake pad (indicated by solid lines), a clamping force of the brake pad 10 is shown to increase rapidly in a stepwise manner from a position of 0.04 mm, and in a case of a worn brake pad (indicated by dotted lines), a clamping force of the brake pad 10 is shown to increase rapidly in a stepwise manner from a position of 0.12 mm.

As such, a position at which the brake pad 10 contacts the brake disc 13 may change depending on a kind or state of the brake pad 10. Because a clamping force increases rapidly when the brake pad 10 contacts the brake disc 13, current flowing through the motor 161 that moves the brake pad 10 forward may change rapidly, or revolutions per minute (rpm) of the motor 161 may change rapidly. According to the disclosure, a position at which the brake pad 10 contacts the brake disc 13 may be detected by detecting a change of current or a change in rpm of the motor 161.

Figure 4:
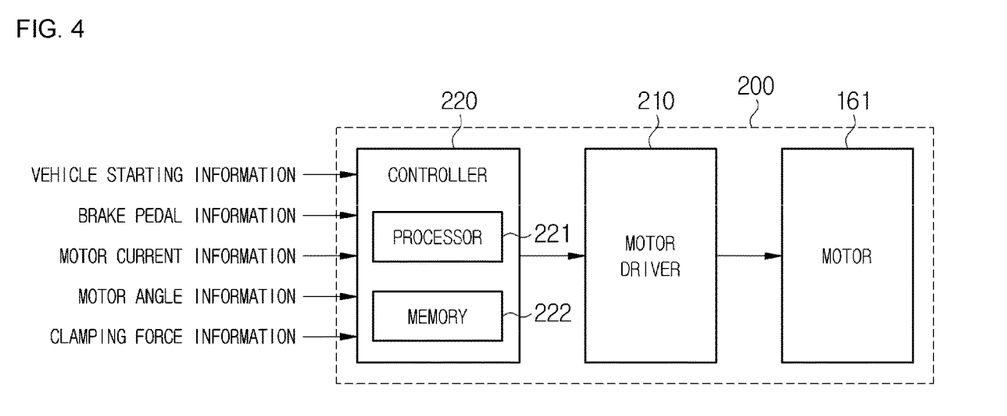
FIG. 4 shows a configuration of an electromechanical brake system according to an embodiment.

FIG. 4 shows a configuration of an electromechanical brake system according to an embodiment.

Referring to FIG. 4, the electromechanical brake system 200 may include the motor 161, a motor driver 210, and the controller 220.

The motor driver 210 may drive the motor 161. The motor driver 210 may drive the motor 161 in a forward rotation direction or a reverse rotation direction. The motor driver 210 may cause the electromechanical brake 100 to perform a braking operation by driving the motor 161 in the forward rotation direction, and may cause the electromechanical brake 100 to perform a braking release operation by driving the motor 161 in the reverse rotation direction. The motor driver 210 may generate motor current for driving the motor 161 in the forward rotation direction or the reverse rotation direction and apply the motor current to the motor 161. For example, the motor driver 210 may include an H-bridge circuit configured with a plurality of power switching devices to drive the motor 141 in the forward rotation direction or the reverse rotation direction.

The controller 220 may receive vehicle starting information from an Engine Management System (EMS) of the vehicle, or may receive brake pedal information from another system that performs communications through a Controller Area Network (CAN) which is an in-vehicle network. The vehicle starting information may be information indicating an ignition ON or OFF state of the vehicle.

The controller 220 may receive the brake pedal information through a brake pedal position sensor or receive the brake pedal information from another system that performs CAN communication. For example, the controller 220 may receive the brake pedal information from an Anti-lock Braking System (ABS) or a Traction Control System (TCS). The brake pedal information may be a control signal of a brake pedal stepped on by a driver.

The controller 220 may receive current information of the motor 161 and angle information of the motor 161 from the motor driver 210. The motor driver 210 may measure current supplied when driving the motor 161 and transmit information about the measured current to the controller 220, or the motor driver 210 may detect angle information of the motor 161 and transmit the detected angle information to the controller 220. Alternatively, the motor driver 210 may detect rpm of the motor 161 and transmit information about the detected rpm to the controller 220.

The controller 220 may receive clamping force information about a clamping force between the brake disc 13 and the brake pad 10 from the sensor 140. The clamping force information may represent the clamping force between the brake pad 10 and the brake disc 13.

The controller 220 may drive the motor 161 in response to a braking signal generated by an operation of the brake pedal stepped on by the driver. The controller 220 may perform a braking apply mode or a braking release mode according to the braking signal generated by the operation of the brake pedal stepped on by the driver.

When braking is released, the controller 220 may drive the motor 161 such that the brake pad 10 is spaced the preset gap distance d from the brake disc 13.

The controller 220 may set an origin position at which the brake pad 10 is spaced the preset gap distance d from the brake disc 13. The controller 220 may control the brake pad 10 to be maintained at the preset gap distance d from the brake disc 13 by driving the motor 161 based on the origin position.

While the controller 220 moves the brake pad 10 of the electromechanical brake 100 forward, the controller 220 may calculate a differential value of a control parameter for controlling the motor 161 with respect to time, and compare the calculated differential value to a preset reference value to detect occurrence of a contact between the brake pad 10 and the brake disc 13. The controller 220 may set an origin position by storing a contact position at which the contact between the brake pad 10 and the brake disc 13 has occurred and storing a position moved backward by the preset gap distance d from the contact position.

The controller 220 may detect occurrence of a contact by calculating a differential value of a control parameter for controlling the motor 161 with respect to time. The control parameter may include motor current or motor rpm.

According to an embodiment, when the controller 220 moves the brake pad 10 forward, the controller 220 may move the brake pad 10 forward at constant speed. When the brake pad 10 and the brake disc 13 come into contact, a clamping force may change rapidly, and accordingly, current of the motor 161 may instantaneously rapidly rise.

Accordingly, the controller 220 may calculate a differential value of motor current with respect to time while moving the brake pad 10 forward at constant target speed, and when it is determined that the calculated differential value is greater than a preset reference value, the controller 110 may detect occurrence of a contact between the brake pad 10 and the brake disc 13.

Meanwhile, in another embodiment, when the controller 220 moves the brake pad 10 forward, the controller 220 may move the brake pad 10 forward to follow a target clamping force. When the brake pad 10 and the brake disc 13 come into contact, a clamping force may change rapidly, and accordingly, rpm of the motor 161 may be instantaneously rapidly lowered.

Accordingly, the controller 220 may calculate a differential value of rpm of the motor 161 with respect to time while moving the brake pad 10 forward based on the target clamping force, and when it is determined that the calculated differential value is smaller than a preset reference value, the controller 220 may detect occurrence of a contact between the brake pad 10 and the brake disc 13.

According to the occurrence of the contact between the brake pad 10 and the brake disc 13, the controller 220 may store a contact position. The contact position may be a position of the brake pad 100 at a time at which the contact has been detected based on the differential value of the control parameter with respect to time.

Then, the controller 220 may set an origin position by storing a position moved backward by the preset gap distance d from the contact position. As such, the controller 220 may control the brake pad 10 to be maintained at the preset gap distance d from the brake disc 13 by setting an origin position moved backward by the preset gap distance d from a position at which the brake pad 10 and the brake disc 13 come into contact and controlling a position of the brake pad 10 based on the origin position upon position control of the brake pad 10.

Meanwhile, the controller 220 may set an origin position whenever the vehicle starts. Accordingly, even though a position of the brake pad 10 changes after the vehicle is parked and stalls, the control unit 220 may reset an origin position when the vehicle starts, and control the brake pad 10 to be maintained at the preset gap distance d from the brake disc 13.

According to an embodiment, the controller 220 may determine whether the ignition is turned on, and when it is determined that the ignition is turned on, the controller 220 may move the brake pad 10 forward and set an origin position while the brake pad 10 moves forward.

When the ignition is turned on, the controller 220 may move the brake pad 10 forward and set an origin position although a braking command such as an operation of the brake pedal is not received. A method for setting an origin position while the brake pad 10 moves forward has been described above.

When the ignition is turned on, the controller 220 may set an origin position while moving the brake pad 10 forward until a preset reference clamping force is obtained. The reference clamping force may be a clamping force that is obtained when the brake pad 10 contacts the brake disc 13, and may be preferably a clamping force that is not obtained before the brake pad 10 contacts the brake disc 13.

Meanwhile, at the time at which the ignition is turned on, the brake pad 10 may be already in contact with the brake disc 13. In this case, the controller 220 may fail to detect a time at which the brake pad 10 and the brake disc 13 comes into contact although the controller 220 moves the brake pad 10 forward.

Accordingly, in a case in which the controller 220 fails to set an origin position while the brake pad 10 moves forward until the reference clamping force is obtained, the controller 220 may set an origin position by moving the brake pad 10 backward by a preset distance from an initial position of the brake pad 10 of when the ignition is turned on and then moving the brake pad 10 forward until the reference clamping force is obtained.

That is, because the brake pad 10 is already in contact with the brake disc 13, the controller 220 may fail to set an origin position while the brake pad 10 moves forward until the reference clamping force is obtained. In this case, the controller 220 may move the brake pad 10 backward from the initial position to space the brake pad 10 from the brake disc 13, and then set an origin position while moving the brake pad 10 forward until the reference clamping force is obtained.

Meanwhile, the controller 220 may continuously update the origin position to continuously control a gap between the brake pad 10 and the brake disc 13 while the vehicle travels.

The controller 220 may check whether a contact is determinable in a braking environment while braking is performed and the brake pad 10 moves forward. When it is checked that a contact is determinable, the controller 220 may calculate a differential value of a control parameter for controlling the motor 161 with respect to time, and compare the calculated differential value to a preset reference value to detect occurrence of a contact between the brake pad 10 and the brake disc 13. When it is determined that a difference between a position at which the contact between the brake pad 10 and the brake disc 13 has occurred and a stored contact position is greater than or equal to a preset update reference, the controller 220 may update the contact position to the position at which the contact has occurred, and update the origin position to a position moved backward by a preset gap distance from the contact position.

The controller 220 may update the origin position while braking is performed during driving of the vehicle. When it is checked that a contact is determinable while braking is performed during driving of the vehicle, the controller 220 may update the origin position by detecting occurrence of a contact between the brake pad 10 and the brake disc 13.

When the controller 220 checks whether a contact is determinable in a braking environment, the controller 220 may check that a contact is not determinable according to determination that a clamping force of the brake pad 10 is greater than or equal to a preset determinable clamping force.

When it is determined that a clamping force of the brake pad 10 is greater than or equal to a preset reference value, that is, the determinable clamping force, the controller 220 may check that a contact is not determinable by determining that the brake pad 10 is already in contact with the brake disc 13 and a clamping force has been generated.

Meanwhile, when the controller 220 checks whether a contact is determinable in a braking environment, the controller 220 may check that a contact is determinable in a case in which the brake pad 10 moves forward at constant target speed. In the case in which the brake pad 10 moves forward at the constant target speed, the controller 220 may detect occurrence of a contact by calculating a differential value of motor current with respect to time.

Alternatively, when the controller 220 checks whether a contact is determinable in a braking environment, the controller 220 may check that a contact is determinable in a case of moving the brake pad 10 forward based on the target clamping force. In the case of moving the brake pad 10 forward based on the target clamping force, the controller 220 may detect occurrence of a contact by calculating a differential value of motor rpm with respect to time.

After the controller 220 detects occurrence of a contact between the brake pad 10 and the brake disc 13, the controller 220 may compare a position at which the contact has occurred to a stored contact position. When it is determined that a difference between the position at which the contact has occurred and the stored contact position is smaller than a preset update reference, the controller 220 may not update the contact position. When it is determined that the difference between the position at which the contact has occurred and the stored contact position is smaller than the preset update reference, the controller 220 may not update the contact position by determining that the difference has been caused by a detection error.

When it is determined that the difference between the position at which the contact has occurred and the stored contact position is greater than or equal to the preset update reference, the controller 220 may update the contact position to the position at which the contact has occurred. When it is determined that the difference between the position at which the contact has occurred and the stored contact position is greater than or equal to the preset update reference, the controller 220 may determine that the contact position has changed due to thermal deformation upon braking, wear of the brake pad 10, etc. When it is determined that the contact position has changed, the controller 220 may update the contact position to the position at which the contact has occurred, thereby reflecting the change of the contact position.

After the contact position is updated, the controller 220 may update the origin position. The controller 220 may update the origin position to a position moved backward by a preset gap distance from the contact position, thereby reflecting the change of the origin position according to the change of the contact position.

The controller 220 may include a plurality of semiconductor devices, and may be called other various names such as an Electronic Control Unit (ECU). The controller 220 may include a memory 222 and a processor 221. The memory 222 and the processor 221 may be implemented as separate semiconductor devices or as a single semiconductor device. The controller 220 may include a plurality of processors and/or a plurality of memories.

The memory 222 may memorize/store programs and data for braking the vehicle depending on a driver's intention to brake. For example, the memory 222 may memorize/store programs and data for controlling the motor 161 to provide a clamping force to the brake pad 10 depending on the driver's intention to brake. Also, the memory 222 may memorize/store programs and data for detecting occurrence of a contact between the brake pad 10 and the brake disc 13 while the brake pad 10 moves forward, and setting an origin position from a detected contact position.

The memory 222 may provide a program and data to the processor 221 and may memorize temporary data generated during arithmetic operations of the processor 221.

The memory 222 may include volatile memory, such as Static Random Access Memory (S-RAM) and Dynamic Random Access Memory (D-RAM), and non-volatile memory, such as Read Only Memory (ROM), Erasable Programmable Read Only Memory (EPROM), and flash memory. The memory 222 may include a semiconductor device or a plurality of semiconductor devices.

The processor 221 may provide a control signal to the motor 161 according to a program and data provided from the memory 222. For example, the processor 221 may provide a driving signal for generating a clamping force to the motor driver 210.

The processor 221 may include an arithmetic circuit, a memory circuit, and a control circuit. The processor 221 may include a semiconductor device or a plurality of semiconductors. Also, the processor 221 may include a core or a plurality of cores in a semiconductor device. The processor 221 may be called various names, such as a Micro Processing Unit (MPU).

As such, the controller 220 may control the motor 161 through the motor driver 210 to brake the vehicle depending on a braking signal output from a brake pedal sensor.

Figure 5:
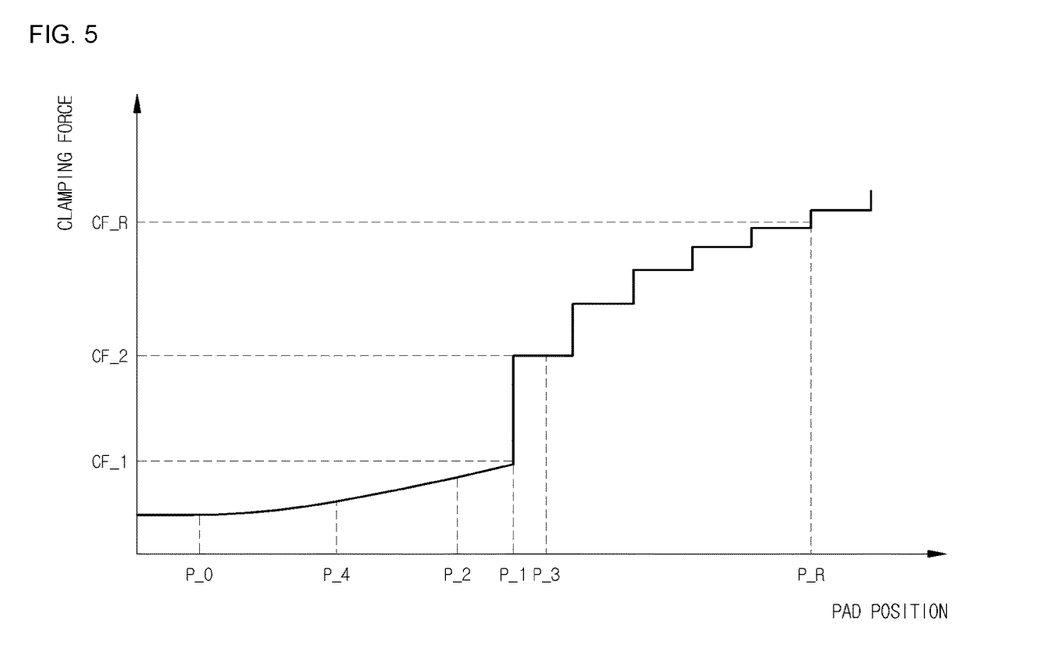
FIG. 5 shows clamping forces according to positions of a brake pad when an electromechanical brake system according to an embodiment sets an origin position.

FIG. 5 shows clamping forces according to positions of a brake pad when an electromechanical brake system according to an embodiment sets an origin position.

FIG. 5 shows an example of clamping forces with respect to positions of the brake pad 10 as shown in FIG. 3. FIG. 5 shows a case in which the controller 220 sets an origin position while moving the brake pad 10 forward when ignition is turned on.

The controller 220 may move the brake pad 10 forward from an initial position P_0 of when ignition is turned on until a preset reference clamping force CF_R is obtained.

While the brake pad 10 moves forward from the initial position P_0, a clamping force may increase rapidly from a first clamping force CF_1 to a second clamping force CF_2 at a moment at which the brake pad 10 contacts the brake disc 13 at a contact position P_1.

Due to the increase of the clamping force, a rapid change may occur in a control parameter such as motor current or motor rpm, and the controller 220 may detect a contact between the brake pad 10 and the brake disc 13 based on a differential value of the control parameter with respect to time.

After the controller 220 detects the contact between the brake pad 10 and the brake disc 13 at the contact position P_1, the controller 220 may store the contact position P_1 and set a position moved backward by the preset gap distance d from the contact position P_1 to an origin position P_2.

Meanwhile, when the ignition is turned on, the brake pad 10 may be positioned at an initial position P_3 that is ahead of the contact position P_1. In this case, the controller 220 may fail to detect the contact position P_1 by moving the brake pad 10 forward, because the brake pad 10 is already positioned ahead of the contact position P_1.

In this case, the controller 220 may move the brake pad 10 forward from the initial position P_3 of when the ignition is turned on until the reference clamping force CF_R is obtained. Because the controller 220 has failed to detect the contact position P_1 and set an origin position while the brake pad 10 moves forward to a position P_R at which the preset reference clamping force CF_R is obtained, the controller 220 may move the brake pad 10 to a position P_4 moved backward by the preset gap distance d from the initial position P_3 of when the ignition is turned on. Thereafter, the controller 220 may again move the brake pad 10 forward until the reference clamping force CF_R is obtained, and detect a contact between the brake pad 10 and the brake disc 13 based on a differential value of a control parameter with respect to time.

Thereafter, when the controller 220 detects a contact between the brake pad 10 and the brake disc 13 at the contact position P_1, the controller 220 may store the contact position P_1, and set a position moved backward by the preset gap distance d from the contact position P_1 to an origin position P_2.

Figure 6:
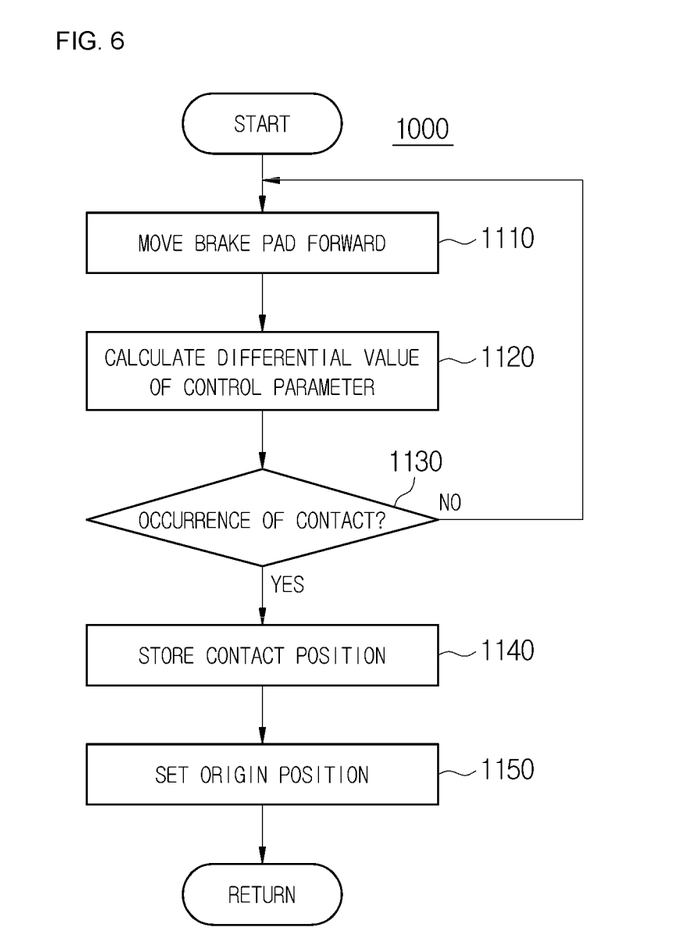
FIG. 6 shows a method for controlling an electromechanical brake system according to an embodiment.

FIG. 6 shows a method for controlling an electromechanical brake system according to an embodiment.

In a method 1000 for controlling the electromechanical brake system 200 according to an embodiment, the controller 220 may move the brake pad 10 of the electromechanical brake 100 forward (operation 1110).

While the controller 220 moves the brake pad 10 forward, the controller 220 may calculate a differential value of a control parameter for controlling the motor 161 with respect to time (operation 1120).

The controller 220 may compare the calculated differential value to a predetermined reference value to detect occurrence of a contact between the brake pad 10 and the brake disc 13 of the electromechanical brake 100 (operation 1130).

When the controller 220 fails to detect occurrence of a contact to the brake disc 13 (NO in operation 1130), the controller 220 may repeat the above-described operations until a contact occurs.

When the controller 220 detects occurrence of a contact to the brake disc 13 (YES in operation 1130), the controller 220 may store a contact position at which the brake pad 10 contacts the brake disc 13 (operation 1140).

The controller 220 may set an origin position by storing a position moved backward by a preset gap distance d from the contact position (operation 1150).

Figure 7:
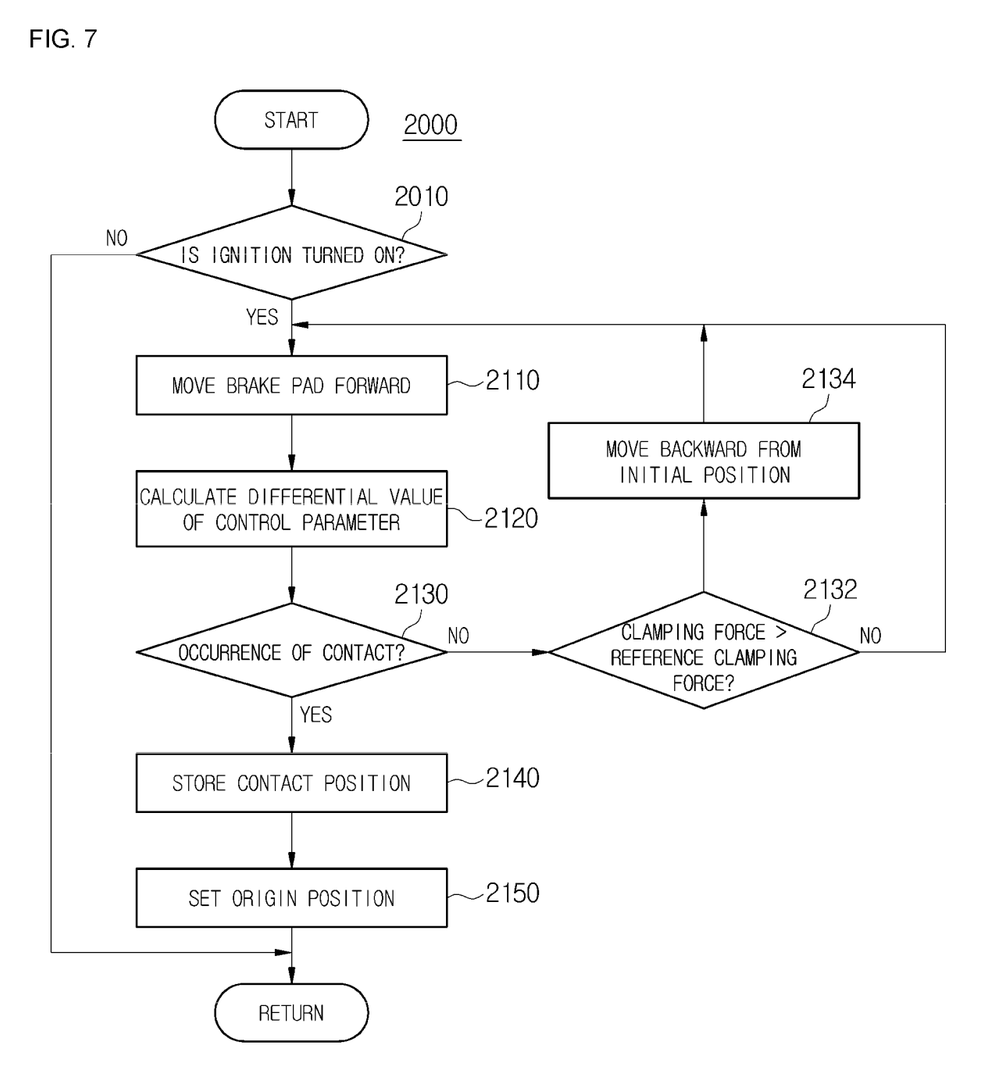

FIG. 7 shows a method for controlling an electromechanical brake system according to an embodiment when ignition is turned on.

In a method 2000 for controlling the electromechanical brake system 200 according to an embodiment, the controller 220 may check whether ignition is turned on (operation 2010).

When it is checked that the ignition is not turned on (NO in operation 2010), the controller 220 may terminate a setting.

When it is checked that the ignition is turned on (YES in operation 2010), the controller 220 may move the brake pad 10 forward (operation 2110).

The controller 220 may calculate a differential value of a control parameter for controlling the motor 161 with respect to time while moving the brake pad 10 forward (operation 2120).

The controller 220 may compare the calculated differential value to a preset reference value to detect occurrence of a contact between the brake pad 10 and the brake disc 13 of the electromechanical brake 100 (operation 2130).

When the controller 220 fails to detect occurrence of a contact to the brake disc 13 (NO in operation 2130), the controller 220 may repeat the above-described operations until a contact occurs.

When the controller 220 fails to set an origin position while the brake pad 10 moves forward until a reference clamping force is obtained (YES in operation 2132), the controller 220 may move the brake pad 10 backward by a preset distance from an initial position of the brake pad 10 of when the ignition is turned on (operation 2134), and determine whether a contact occurs while moving the brake pad 10 forward until the reference clamping force is obtained.

When the controller 220 detects occurrence of a contact to the brake disc 13 (YES in operation 2130), the controller 220 may store a contact position at which the contact between the brake pad 10 and the brake disc 13 occurs (operation 2140).

The controller 220 may set an origin position by storing a position moved backward by the preset gap distance d from the contact position (operation 2150).

Figure 8:
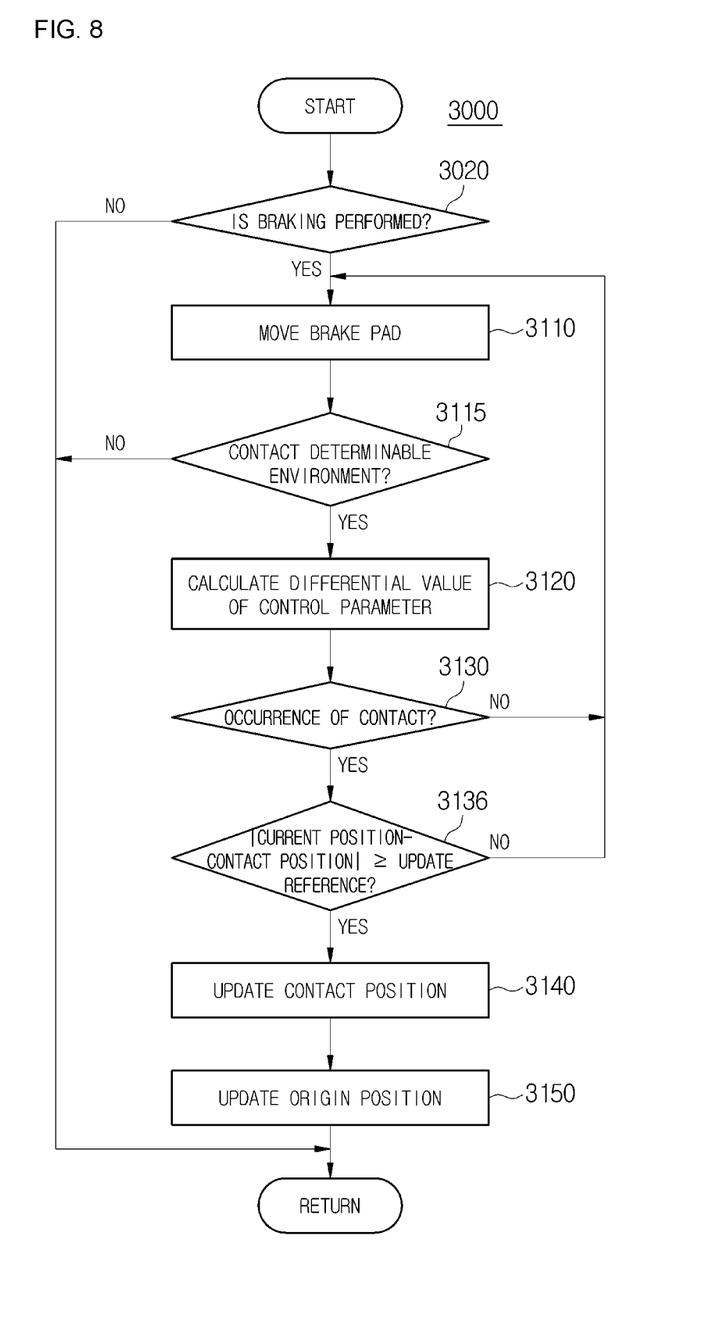
FIG. 8 shows a method for controlling an electromechanical brake system according to an embodiment when braking is performed.

FIG. 8 shows a method for controlling an electromechanical brake system according to an embodiment when braking is performed.

In a method 3000 for controlling the electromechanical brake system 200 according to an embodiment, the controller 220 may determine whether braking is performed (operation 3020).

When it is determined that braking is not performed (NO in operation 3020), the controller 220 may terminate a setting.

When it is determined that braking is performed (YES in operation 3020), the controller 220 may move the brake pad 10 forward.

The controller 220 may check whether a contact is determinable in a braking environment while braking is performed and the brake pad 10 moves forward (operation 3115).

When it is checked that a contact is not determinable (NO in operation 3115), the controller 220 may terminate a setting.

When it is checked that a contact is determinable (YES in operation 3115), the controller 220 may calculate a differential value of a control parameter for controlling the motor 161 with respect to time (operation 3120).

The controller 220 may compare the calculated differential value to a preset reference value to detect occurrence of a contact between the brake pad 10 and the brake disc 13 of the electromechanical brake 100 (operation 3130).

When the controller 220 fails to detect a contact to the brake disc 13 (NO in operation 3130), the controller 220 may repeat the above-described operations until a contact occurs.

When the controller 220 detects occurrence of a contact to the brake disc 13 (YES in operation 3130), the controller 220 may determine whether a difference between a position at which the contact between the brake pad 10 and the brake disc 130 has occurred and a stored contact position is greater than or equal to a preset update reference (operation 3136).

When it is determined that the difference between the position at which the contact between the brake pad 10 and the brake disc 130 has occurred and the stored contact position is smaller than the preset update reference (NO in operation 3136), the controller 220 may terminate a setting.

When it is determined that the difference between the position at which the contact between the brake pad 10 and the brake disc 130 has occurred and the stored contact position is greater than or equal to the preset update reference (YES in operation 3136), the controller 220 may update the contact position to the position at which the contact has occurred (operation 3140).

The controller 220 may set an origin position by storing a position moved backward by the preset gap distance d from the contact position (operation 3150).

The electromechanical brake system according to an embodiment of the disclosure and the control method thereof may perform position control of the brake pad by determining a position of the brake pad without using a sensor.

The electromechanical brake system according to an embodiment of the disclosure and the control method thereof may prevent a drag phenomenon by determining a position at which the brake pad contacts the brake disc to control the brake pad.

The electromechanical brake system according to an embodiment of the disclosure and the control method thereof may maintain a gap between the brake pad and the brake disc against changes such as thermal expansion during driving by setting a position of the brake pad when the vehicle starts and continuously updating a position of the brake pad during driving.

So far, the disclosed embodiments have been described with reference to the accompanying drawings. It will be apparent that those skilled in the art can make various modifications thereto without changing the technical spirit and essential features of the present disclosure. Thus, it should be understood that the embodiments described above are merely for illustrative purposes and not for limitation purposes in all aspects.

What is claimed is:

1. An electromechanical brake system including an actuator of an electromechanical brake that operates by a motor, comprising:
    a motor driver configured to drive the motor; and
    a controller electrically connected to the motor driver,
    wherein the controller is configured to calculate a differential value of a control parameter for controlling the motor with respect to time while moving a brake pad of the electromechanical brake forward, compare the calculated differential value to a preset reference value to detect occurrence of a contact between the brake pad and a brake disc of the electromechanical brake, store a contact position at which the contact between the brake pad and the brake disc has occurred, and set an origin position by storing a position moved backward by a preset gap distance from the contact position, and
    wherein the controller is configured to check whether ignition is turned on, set the origin position while the brake pad moves forward until a preset reference clamping force is obtained when it is checked that the ignition is turned on, and when the controller fails to set the origin position while the brake pad moves forward until the reference clamping force is obtained, and move the brake pad backward by a preset distance from an initial position of the brake pad of when the ignition is turned on, and move the brake pad forward until the reference clamping force is obtained.

2. The electromechanical brake system of claim 1, wherein the control parameter is motor current, and
    the controller is configured to calculate a differential value of the motor current with respect to time while moving the brake pad forward at constant target speed, and
    detect the occurrence of the contact between the brake pad and the brake disc, according to determination that the calculated differential value is greater than the preset reference value.

3. The electromechanical brake system of claim 1, wherein the control parameter is motor revolutions per minute (rpm), and
    the controller is configured to calculate a differential value of the motor rpm with respect to time while moving the brake pad forward based on a target clamping force, and
    detect the occurrence of the contact between the brake pad and the brake disc, according to determination that the calculated differential value is smaller than the preset reference value.

4. The electromechanical brake system of claim 1, wherein the controller is configured to check whether a contact is determinable in a braking environment while braking is performed and the brake pad moves forward, calculate a differential value of a control parameter for controlling the motor with respect to time when it is checked that a contact is determinable, compare the calculated differential value to a preset reference value to detect the occurrence of the contact between the brake pad and the brake disc, update, when a difference between a position at which the contact between the brake pad and the brake disc has occurred and a stored contact position is greater than or equal to a preset update reference, the contact position to the position at which the contact has occurred, and update the origin position to a position moved backward by a preset gap distance from the contact position.

5. The electromechanical brake system of claim 4, wherein the controller is configured to determine, when it is checked whether a contact is determinable in the braking environment, that a contact is not determinable according to determination that a clamping force of the brake pad is greater than or equal to a preset determinable clamping force.

6. The electromechanical brake system of claim 5, wherein the control parameter is motor current, and
    the controller is configured to determine, when it is checked whether a contact is determinable in the braking environment, that a contact is determinable according to determination that the brake pad moves forward at constant target speed.

7. The electromechanical brake system of claim 5, wherein the control parameter is motor revolutions per minute (rpm), and
    the controller is configured to determine, when it is checked whether a contact is determinable in the braking environment, that a contact is determinable when the controller moves the brake pad forward based on a target clamping force.

8. A method for controlling an electromechanical brake system including an actuator of an electromechanical brake that operates by a motor, the method comprising:
    calculating a differential value of a control parameter for controlling the motor with respect to time while moving a brake pad of the electromechanical brake forward;
    comparing the calculated differential value to a preset reference value to detect occurrence of a contact between the brake pad and a brake disc of the electromechanical brake;
    storing a contact position at which the contact between the brake pad and the brake disc has occurred;
    setting an origin position by storing a position moved backward by a preset gap distance from the contact position,
    checking whether ignition is turned on;
    setting the origin position while the brake pad moves forward until a preset reference clamping force is obtained when it is checked that the ignition is turned on; and
    when setting the origin position fails while the brake pad moves forward until the reference clamping force is obtained, moving the brake pad backward by a preset distance from an initial position of the brake pad of when the ignition is turned on, and moving the brake pad forward until the reference clamping force is obtained.

9. The method of claim 8, wherein the control parameter is motor current, the calculating of the differential value of the control parameter with respect to time comprises calculating a differential value of the motor current with respect to time while moving the brake pad forward at constant target speed, and the detecting of the occurrence of the contact comprises detecting the occurrence of the contact between the brake pad and the brake disc when the calculated differential value is greater than the preset reference value.

10. The method of claim 8, wherein the control parameter is motor revolutions per minute (rpm), the calculating of the differential value of the control parameter with respect to time comprises calculating a differential value of the motor rpm with respect to time while moving the brake pad forward based on a target clamping force, and the detecting of the occurrence of the contact comprises detecting the occurrence of the contact between the brake pad and the brake disc when the calculated differential value is smaller than the preset reference value.

11. The method of claim 8, comprising:

checking whether a contact is determinable in a braking environment while braking is performed and the brake pad moves forward;

calculating a differential value of a control parameter for controlling the motor with respect to time when it is checked that a contact is determinable;

comparing the calculated differential value to a preset reference value to detect occurrence of a contact between the brake pad and the brake disc;

updating, when a difference between a position at which the contact between the brake pad and the brake disc has occurred and a stored contact position is greater than or equal to a preset update reference, the contact position to the position at which the contact has occurred; and updating the origin position to a position moved backward by a preset gap distance from the contact position.

12. The method of claim 11, wherein the checking of whether the contact is determinable in the braking environment comprises determining that a contact is not determinable according to determination that a clamping force of the brake pad is greater than or equal to a preset determinable clamping force.

13. The method of claim 12, wherein the control parameter is motor current, and the checking of whether the contact is determinable in the braking environment comprises determining that a contact is determinable according to determination that the brake pad moves forward at constant target speed.

14. The method of claim 12, wherein the control parameter is motor revolutions per minute (rpm), and the checking of whether the contact is determinable in the braking environment comprises determining that a contact is determinable when the brake pad moves forward based on a target clamping force.

* * * * *